United States Patent
Adachi et al.

(10) Patent No.: US 10,259,499 B2
(45) Date of Patent: Apr. 16, 2019

(54) ROTATING CONNECTOR

(71) Applicant: Yazaki Corporation, Tokyo (JP)

(72) Inventors: Hideki Adachi, Makinohara (JP); Norihito Suzuki, Makinohara (JP); Yuji Migimatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 294 days.

(21) Appl. No.: 14/753,549

(22) Filed: Jun. 29, 2015

(65) Prior Publication Data

US 2015/0375787 A1 Dec. 31, 2015

(30) Foreign Application Priority Data

Jun. 30, 2014 (JP) ................................. 2014-134955

(51) Int. Cl.
| | | |
|---|---|---|
| *B60R 16/027* | (2006.01) | |
| *B62D 15/02* | (2006.01) | |
| *F16D 66/00* | (2006.01) | |

(52) U.S. Cl.
CPC ........ *B62D 15/0215* (2013.01); *B60R 16/027* (2013.01); *B62D 15/022* (2013.01);
(Continued)

(58) Field of Classification Search
CPC ..... B60R 16/027; B60R 16/02; B60R 16/023; B62D 15/021; B62D 15/0215;
(Continued)

(56) References Cited

U.S. PATENT DOCUMENTS 6,367,337 B1 * 4/2002 Schlabach ................ B62D 6/10
180/443
7,445,451 B2 * 11/2008 Tanaka .................. B60R 16/027
439/15
(Continued)

FOREIGN PATENT DOCUMENTS

| CN | 103072622 A | 5/2013 |
|---|---|---|
| CN | 103723192 A | 4/2016 |

(Continued)

OTHER PUBLICATIONS

"How Gear Ratios Work". Brain, Marshall. First Published: Nov. 20, 2000. HowStuffWorks.com. Revised: Jun. 2, 2013. [retrieved on May 23, 2018]. Retrieved from the Internet <URL: https://web.archive.org/web/20130602234700/https://science.howstuffworks.com/transport/engines-equipment/gear-ratio.htm>.*

(Continued)

*Primary Examiner* — Josh Skroupa
(74) *Attorney, Agent, or Firm* — Sughrue Mion, PLLC

(57) ABSTRACT

A rotating connector includes a movable housing and a steering angle sensor unit. The movable housing includes a cylindrical section through which a steering shaft penetrates and a main gear integrally molded with the movable housing on an outer circumferential surface of the cylindrical section along a rotation direction. The steering angle sensor unit includes a fixed-side housing into which the cylindrical section of the movable housing is inserted, a satellite gear which is provided in the fixed-side housing and meshed with the main gear, and a rotation angle detection unit which is provided in the fixed-side housing and detects rotation of the satellite gear.

14 Claims, 6 Drawing Sheets

(52) U.S. Cl.
CPC .... *F16C 2233/00* (2013.01); *F16D 2066/003* (2013.01); *Y10T 464/20* (2015.01)

(58) Field of Classification Search
CPC ............... B62D 15/022; F16C 2233/00; F16D 2066/003; Y10T 464/20
USPC .......................................................... 464/23
See application file for complete search history.

(56) References Cited

U.S. PATENT DOCUMENTS

| | | | | |
|---|---|---|---|---|
| 7,665,573 | B2* | 2/2010 | Lee | B62D 15/0215 180/443 |
| 7,758,363 | B2* | 7/2010 | Tanaka | B60R 16/027 439/15 |
| 7,868,611 | B2* | 1/2011 | Sano | G01D 11/245 324/207.25 |
| 8,281,687 | B2* | 10/2012 | Koma | B62D 15/0215 74/575 |
| 8,813,578 | B2* | 8/2014 | Kaess | B62D 15/0215 324/207.2 |
| 8,963,543 | B2* | 2/2015 | Moldenhauer | B62D 15/0215 324/207.2 |
| 9,212,892 | B2* | 12/2015 | Takayanagi | B62D 15/0215 |
| 9,882,329 | B2* | 1/2018 | Legoubin | B60R 16/027 |
| 2006/0146860 | A1 | 7/2006 | Suzuki et al. | |
| 2010/0190557 | A1 | 7/2010 | Suzuki et al. | |
| 2010/0235054 | A1 | 9/2010 | Hoskins et al. | |
| 2014/0103912 | A1 | 4/2014 | Schneiders et al. | |
| 2014/0266168 | A1 | 9/2014 | Utsunomiya et al. | |

FOREIGN PATENT DOCUMENTS

| | | |
|---|---|---|
| JP | 2000159037 A | 6/2000 |
| JP | 2004262400 A | 9/2004 |
| JP | 2008047550 A | 2/2008 |
| JP | 2010177039 A | 8/2010 |
| JP | 2014137859 A | 7/2014 |
| KR | 10-2010-0080979 A | 7/2010 |
| KR | 10-2011-0011058 A | 2/2011 |
| WO | 2010/104942 A1 | 9/2010 |

OTHER PUBLICATIONS

Office Action dated Apr. 25, 2017, issued by the State Intellectual Property Office of the People's Republic of China in counterpart Chinese Patent Application No. 201510373004.9.

Communication dated Dec. 12, 2017, from the State Intellectual Property Office of People's Republic of China in counterpart Application No. 201510373004.9.

Notification of Reasons for Refusal dated Apr. 3, 2018, in corresponding JP Application No. 2014-134955, 7 pages in English and Japanese.

* cited by examiner

ROTATING CONNECTOR

CROSS REFERENCE TO RELATED APPLICATION(S)

This application is based upon and claims the benefit of priority of Japanese Patent Application No. 2014-134955 filed on Jun. 30, 2014, the contents of which are incorporated herein by reference in its entirety.

BACKGROUND OF THE INVENTION

1. Field of the Invention

The present invention relates to a rotating connector that includes a steering angle sensor unit which detects a rotation angle of a steering shaft or the like in an automobile.

2. Description of the Related Art

A steering wheel of an automobile has a horn, an airbag, a switch of an audio system, or the like. A rotating connector is provided to connect between a part on a rotating side which rotates along with the steering wheel and a part on a fixed side which does not rotate, using a flexible flat cable, such that the above various parts with which the steering wheel is equipped are electrically connected to an automobile body side even in a case where the steering wheel rotates. In addition, a steering angle sensor unit which detects a rotation angle of a steering shaft to perform drive control during driving of an automobile is assembled into the rotating connector (see JP-A-2010-177039 as Patent Literature 1).

Patent Literature 1: JP-A-2010-177039

SUMMARY OF THE INVENTION

One of the steering angle sensor units described above includes a rotator that rotates along with a rotating connector, an annular gear, a follower gear having a magnet meshed with the annular gear, and a magnetic sensor that detects a change in a magnetic field based on rotation of the follower gear. In the steering angle sensor unit, steering rotates, thereby, the rotation thereof causes the follower gear to rotate through the annular gear, and the rotation of the follower gear is detected by the magnetic sensor. A rotation angle of the steering is obtained based on the detection result of the magnetic sensor.

An assembly clearance is formed between the rotator and the annular gear assembled into the rotator. Thus, the annular gear is shifted from or to the rotator due to the assembly clearance between these parts, a detection error of the rotation angle of the steering occurs, and thus, steering angle detection performance deteriorates.

In addition, there is a demand for miniaturization of the rotating connector which is provided around the steering wheel.

In light of such circumstances, a non-limited object of one or more embodiments of the present invention is to provide a rotating connector which includes a steering angle sensor unit that can be improved in steering angle detection performance and that can be reduced in size.

Aspects of the present invention are exemplified as follows.

(1) A rotating connector including:

a movable housing that includes a cylindrical section through which a steering shaft penetrates and a main gear integrally molded with the movable housing on an outer circumferential surface of the cylindrical section along a rotation direction; and a steering angle sensor unit that includes a fixed-side housing into which the cylindrical section of the movable housing is inserted, a satellite gear which is provided in the fixed-side housing and meshed with the main gear, and a rotation angle detection unit which is provided in the fixed-side housing and detects rotation of the satellite gear.

(2) The rotating connector according to the configuration (1), wherein the movable housing includes a first housing having a first cylindrical section and a second housing having a second cylindrical section, and the cylindrical section is formed by causing the first cylindrical section and the second cylindrical section to be integrally formed with each other.

(3) The rotating connector according to the configuration (2), wherein the main gear is formed on the first cylindrical section.

(4) The rotating connector according to the configuration (3), wherein the first housing includes a cancel cam formed on the first cylindrical section, which causes a turn lever to be shifted to a neutral position, and the main gear is formed on the first cylindrical section to be adjacent to the cancel cam.

In the rotating connector having the configuration (1), the main gear with which the satellite gear is meshed is integrally molded with the movable housing. Accordingly, it is possible for the main gear not to shift from or to the movable housing compared to a case in which the movable housing and the main gear are separate members. Thus, it is possible to prevent an occurrence of a detection error of the rotation angle of the steering and it is possible to improve steering angle detection performance.

In addition, the main gear and the movable housing are integrally molded and thereby, the main gear and the movable housing can share a thickness portion in their radial direction. Accordingly, the thickness portion is reduced in size with secured sufficient strength such that the main gear can be reduced in size. Thus, the steering angle sensor unit is reduced in size in the radial direction such that miniaturization and reduction of weight can be achieved. In addition, reduction of the number of the components and reduction of an amount of materials can be achieved, a mold cost can also be reduced, and thus, manufacturing costs can be reduced.

In the rotating connector having the configuration (2) or (3), since the movable housing is configured of two parts, efficiency of assembly of the movable housing to the fixed-side housing is improved.

In the rotating connector having the configuration (4), the main gear is molded to be adjacent to the cancel cam. Therefore, it is possible to suppress an influence of torsion of the movable housing when the steering rotates compared to a case in which distance is formed between the cancel cam and the main gear. Accordingly, it is possible to prevent the occurrence of a detection error of the rotation angle of the steering and further, it is possible to improve steering angle detection performance.

According to the aspects of the present invention, it may be possible to provide a rotating connector which includes a steering angle sensor unit that can be improved in steering angle detection performance and can be reduced in size.

Hereinafter, some aspects of the present invention has been concisely described. Further, the following description of the embodiments is read through with reference to the accompanying drawings and thereby, the details of the present invention will become clearer.

DETAILED DESCRIPTION OF THE EXEMPLARY EMBODIMENTS

Hereinafter, examples of the embodiments of the present invention will be described with reference to the accompanying drawings.

Figure 1:
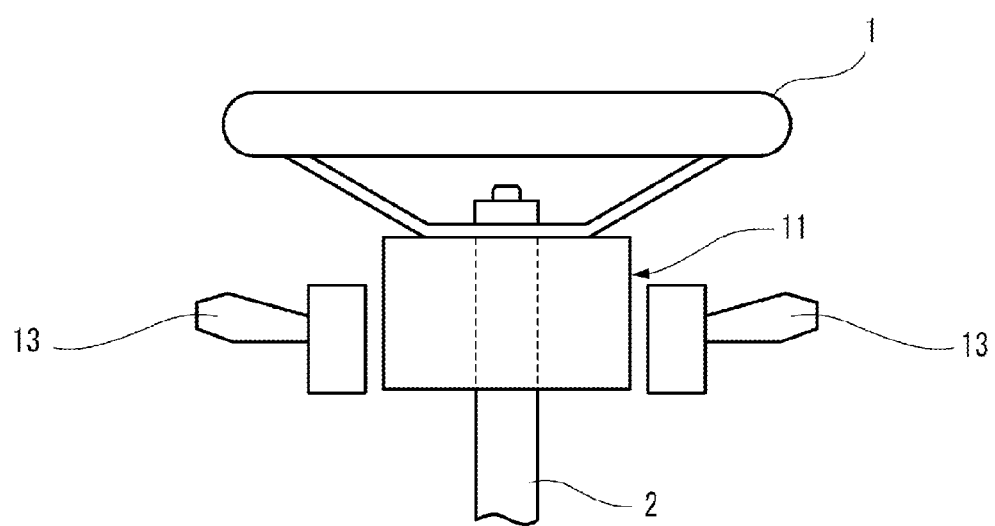
FIG. 1 is a schematic side view of a periphery of a steering shaft.
Figure 2:
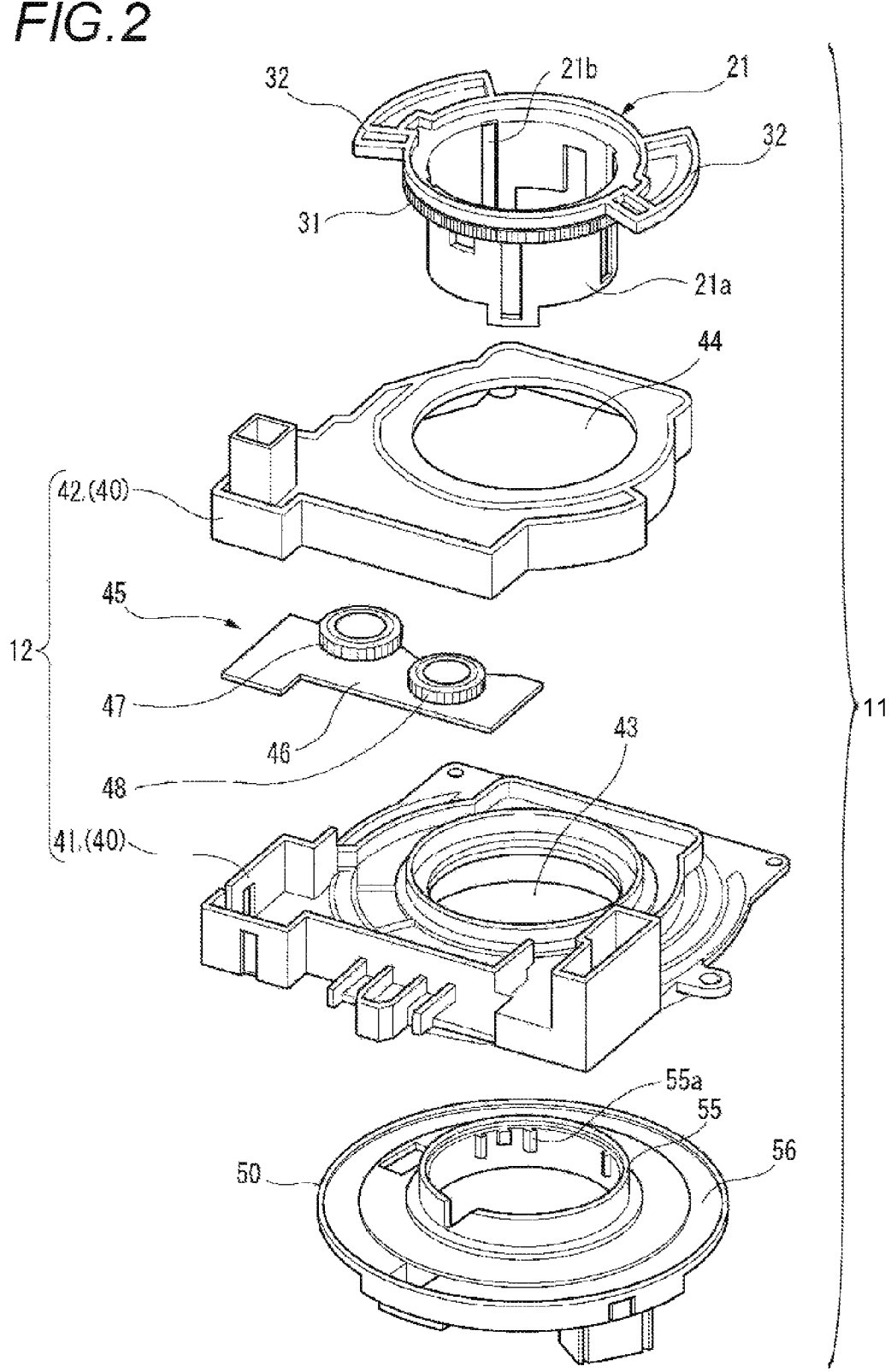
FIG. 2 is an exploded perspective view of a rotating connector that includes a steering angle sensor unit according to the present embodiment.
Figure 3:
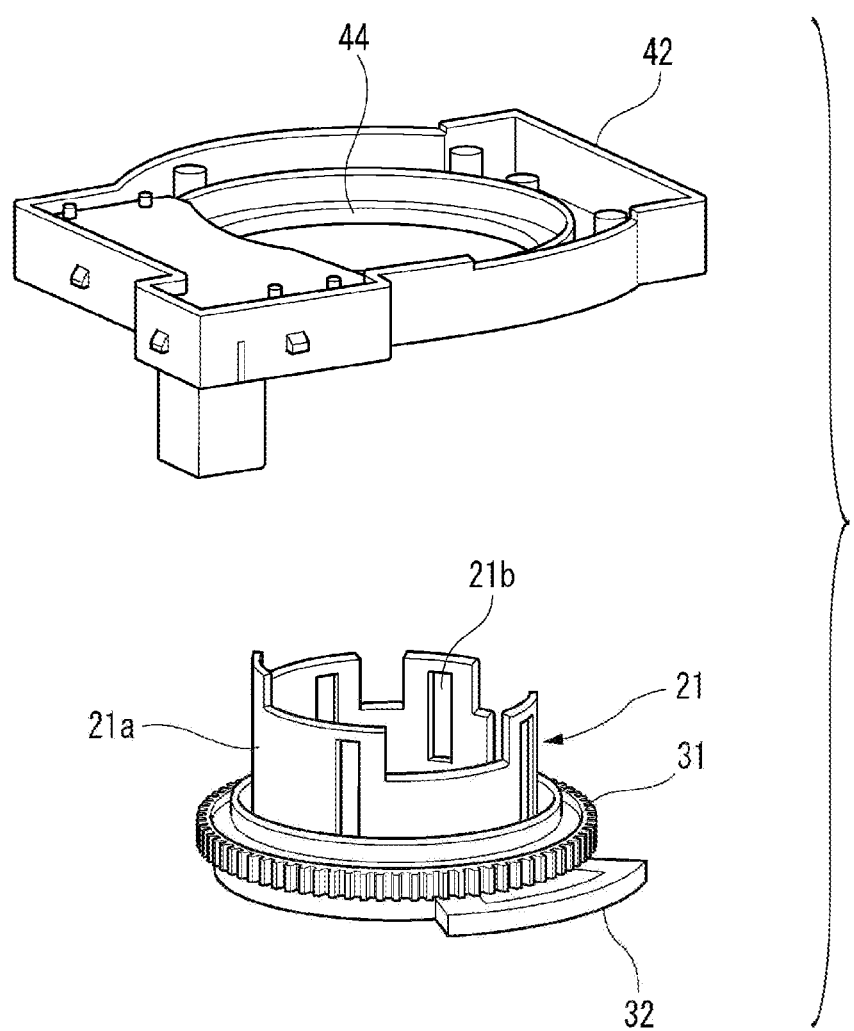
FIG. 3 is a perspective view of a cover and a rotator of the steering angle sensor unit.
Figure 4:
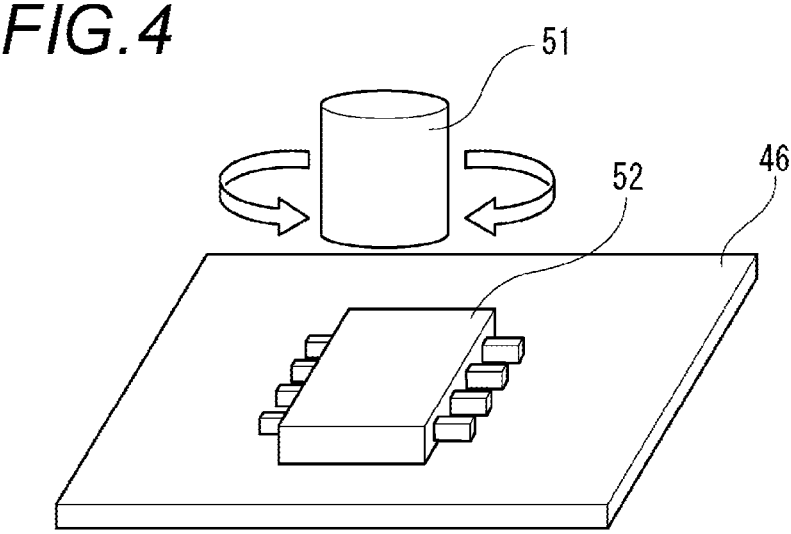
FIG. 4 is a schematic perspective view of a circuit board and a magnet for describing a basic principle of steering angle detection.
Figure 5:
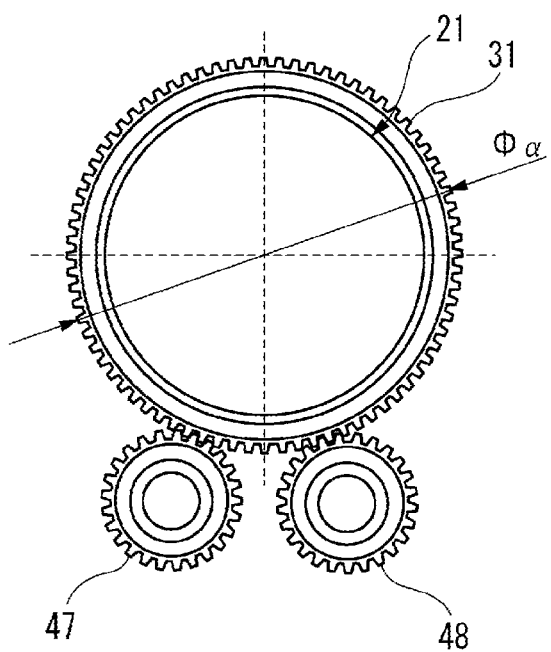
FIG. 5 is a schematic plan view of a main gear and satellite gears constituting the steering angle sensor unit.

FIG. 1 is a schematic side view of a periphery of a steering shaft. FIG. 2 is an exploded perspective view of a rotating connector that includes a steering angle sensor unit according to the present embodiment. FIG. 3 is a perspective view of a cover and a rotator of the steering angle sensor unit. FIG. 4 is a schematic perspective view of a circuit board and a magnet for describing a basic principle of steering angle detection. FIG. 5 is a schematic plan view of a main gear and satellite gears constituting the steering angle sensor unit.

As illustrated in FIG. 1, a rotating connector 11 according to the present embodiment is mounted to a steering shaft 2 having one end fixed to a steering wheel 1. As illustrated in FIG. 2, a steering angle sensor unit 12 is incorporated to the rotating connector 11. The steering angle sensor unit 12 detects a rotation angle of the steering wheel 1 connected to the steering shaft 2 and a detected value of the rotation angle of the steering wheel 1, which is detected by the steering angle sensor unit 12 is used in drive control of a shock absorber damping force controller or a swivel device during driving of an automobile.

As illustrated in FIG. 2, the rotating connector 11 includes the steering angle sensor unit 12, a following housing 21, and a base housing 50.

The following housing 21 is molded of a synthetic resin and is formed in a cylindrical shape. The following housing 21 is referred to as a rotator or a canceller in some cases. Hereinafter, the following housing 21 is referred to as a rotator 21. On the rotator 21, an inner cylinder 21a into which the steering shaft 2 is inserted is formed. The inner cylinder 21a has a hollow cylindrical shape and the steering shaft 2 penetrates through the inner side of the inner cylinder 21a. On a wall demarcating the inner cylinder 21a, a guide groove 21b which guides an engagement portion 55a, to be described below, of the base housing 50 and engages with the engagement portion 55a is formed. In this manner, the rotator 21 is integrally attached to the base housing 50. When the base housing 50 rotates along with rotation of the steering wheel 1, the rotator 21 rotates along with the rotation of the base housing 50. Accordingly, the following housing (rotator) 21 and the base housing 50 integrally rotate. The following housing (rotator) 21 and the base housing 50 are collectively referred to as the movable housing.

The rotator 21 has a cancel cam 32 for causing a turn lever 13 illustrated in FIG. 1, after the turn lever 13 moves in a turning direction of a vehicle, to shift to a neutral position when turning of the turn lever 13 is ended and the steering wheel 1 rotates in a direction opposite to the turning direction. The cancel cam 32 extends from one end of the rotator 21 in its radial direction on one end side of the rotator 21 in its axial direction. Two cancel cams 32 are provided on the one end side of the rotator 21 in its axial direction and thus, the cancel cams 32 have a positional relationship of facing each other.

As illustrated in FIG. 3, a main gear 31 is provided on the outer circumferential surface of the inner cylinder 21a in its circumferential direction (rotation direction of the rotator 21) in the rotator 21. The main gear 31 is formed to be integral with the rotator 21. In addition, the main gear 31 is molded on one end of the rotator 21 on the cancel cam 32 side so as to be adjacent to the cancel cam 32.

The steering angle sensor unit 12 includes a fixed-side housing 40 formed to have a base 41 and a cover 42. The cover 42 is mounted on the base 41. An insertion hole 43 is formed in the base 41 and an insertion hole 44 is formed at a position on the cover 42, which faces the insertion hole 43 when the cover 42 is mounted on the base 41. When the steering angle sensor unit 12, the rotator 21, and the base housing 50 are assembled in the insertion hole 43 and the insertion hole 44, the inner cylinder 21a of the rotator 21 is inserted into the insertion hole 43 of the base 41 and the insertion hole 44 of the cover 42 which communicate with each other.

In addition, a rotation angle detection unit 45 can be assembled into the base 41. When the cover 42 is mounted on the base 41, the rotation angle detection unit 45 assembled into the base 41 is covered with the cover 42. The rotation angle detection unit 45 has a circuit board 46 and satellite gears 47 and 48 are rotatably provided on the circuit board 46. These satellite gears 47 and 48 have different pitch diameters, respectively. As illustrated in FIG. 5, when the steering angle sensor unit 12, the rotator 21, and the base housing 50 are assembled, the main gear 31 integrally molded with the rotator 21 is meshed with the satellite gears 47 and 48 of the steering angle sensor unit 12.

As illustrated in FIG. 4, double-pole magnetized magnets 51 are attached on the center of the satellite gears 47 and 48, respectively. In addition, magnetic sensors 52 are mounted on positions on the circuit board 46, which face the magnets 51 of the satellite gears 47 and 48, respectively. The magnetic sensor 52 detects a direction of a magnetic field generated by the magnet 51.

The base housing 50 is molded of a synthetic resin and has an outer cylinder 55 formed in a hollow cylindrical shape and a discoid flange 56 extending from an outer circumference of the outer cylinder 55 in a horizontal direction. The outer cylinder 55 has an inner diameter greater than an outer diameter of the inner cylinder 21a. Thus, when the rotator 21 is attached to the base housing 50, the inner cylinder 21a is accommodated inside the outer cylinder 55. In addition, the engagement portion 55a is formed on the outer cylinder 55 to protrude from the inner circumferential surface thereof. The engagement portion 55a has a shape which is fit in the guide groove 21b formed on the inner cylinder 21a of the rotator 21. When the inner cylinder 21a of the rotator 21 is accommodated inside the outer cylinder 55 of the base housing 50, the rotator 21 is guided by the guide groove 21b and the engagement portion 55a and is attached to the base housing 50. In this manner, the outer cylinder 55 of the base housing 50 is externally fit to the inner cylinder 21a of the rotator 21. As a result, the rotator 21 and the base housing 50 are integrally rotatable.

A steering connection cable (not illustrated) which is formed of a flexible flat cable or the like is accommodated on the flange 56 in the base housing 50. The steering connection cable is spirally formed to circle the inner cylinder 21a such that the steering wheel 1 on the neutral position can rotate about 900° in rightward and leftward directions, respectively.

In the rotating connector 11 that includes the steering angle sensor unit 12 described above, when the steering wheel 1 rotates, the base housing 50 fixed to the steering wheel 1 rotates. Then, the main gear 31 integrally molded with the rotator 21 which rotates along with the base housing rotates and the satellite gears 47 and 48 meshed with the main gear 31 rotate, respectively. The magnetic sensors 52 detect directions of the magnetic fields generated by the magnets 51 provided on the centers of the satellite gears 47 and 48, respectively. Accordingly, rotation angles of the satellite gears 47 and 48 are obtained by a microcomputer (not illustrated) based on the detected value from the magnetic sensors 52 and further, an absolute steering angle which is the rotation angle of the steering wheel 1 is computed using the rotation angles of the satellite gears 47 and 48.

A steering angle sensor unit according to a reference example is described.

Figure 6:
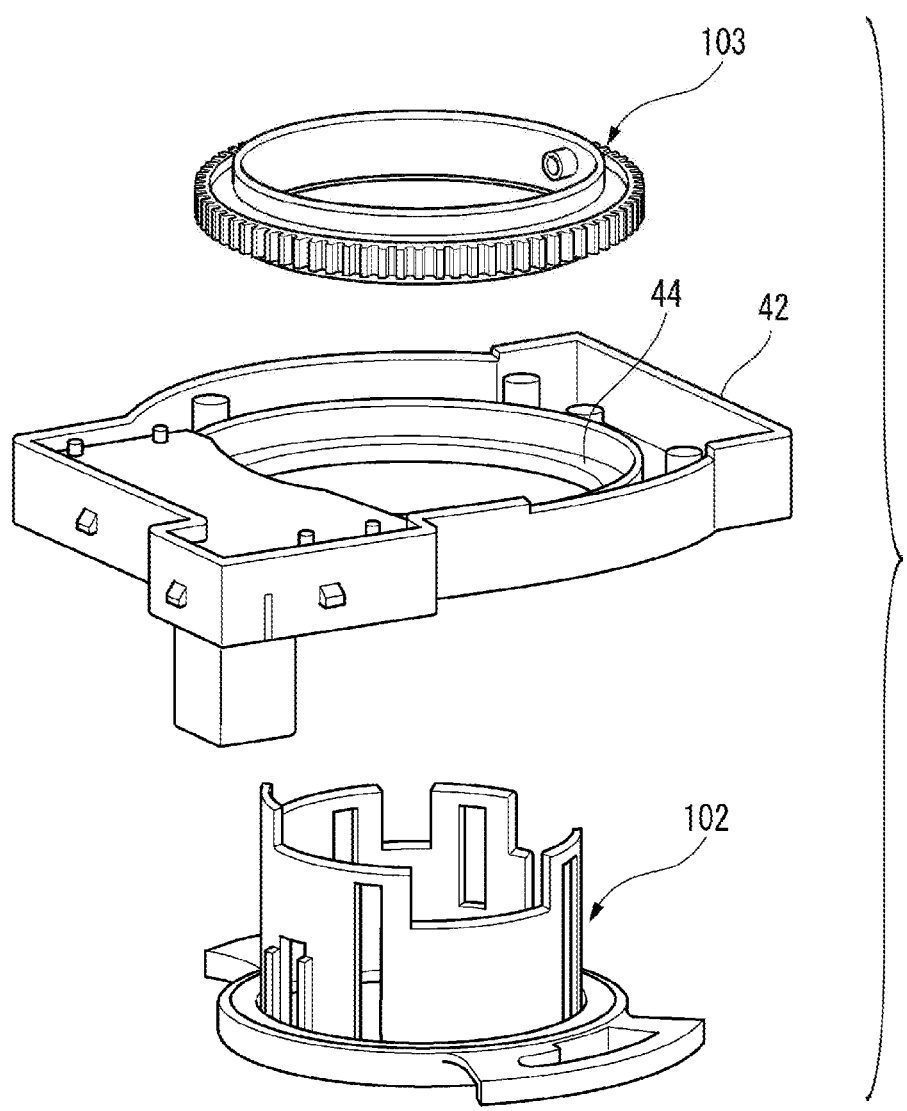
FIG. 6 is a perspective view of a main gear, a cover, and a rotator of a steering angle sensor unit according to a reference example.
Figure 7A:
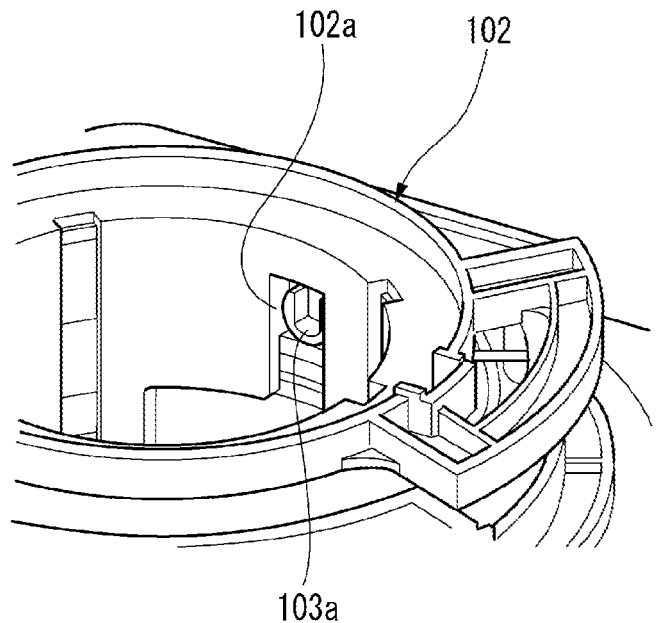
FIG. 7A is a perspective view illustrating an engagement position of the rotator and the main gear of the steering angle sensor unit according to the reference example.
Figure 7B:
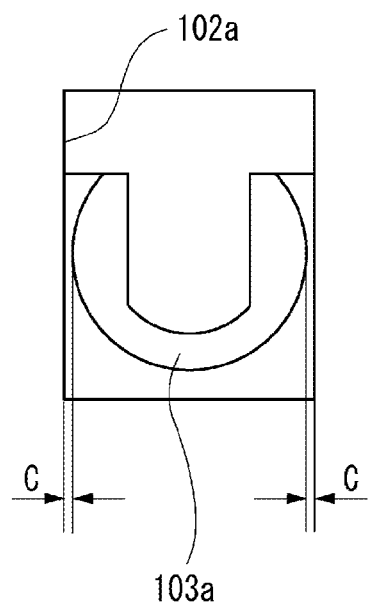
FIG. 7B is a front view of the engagement position of FIG. 7A.

FIG. 6 is a perspective view of a main gear, a cover, and a rotator of the steering angle sensor unit according to the reference example. FIG. 7A and FIG. 7B are respectively a perspective view and a front view illustrating an engagement position of the rotator and the main gear of the steering angle sensor unit according to the reference example.

As illustrated in FIG. 6, the steering angle sensor unit according to the reference example has a rotator 102 and a main gear 103 as two separate members. That is, the rotator 102 is fit in the annularly formed main gear 103.

As illustrated in FIG. 7A and FIG. 7B, a concave engagement portion 102a is formed in the rotator 102 and an engagement protrusion 103a formed on the inner circumferential surface of the main gear 103 is engaged with the concave engagement portion 102a. Accordingly, the main gear 103 integrally rotates with the rotator 102.

Accordingly, in a steering angle sensor unit 101 that has the main gear 103 and the rotator 102 as separate members from each other, an assembly clearance is formed between the components of the rotator 102 and the main gear 103. Specifically, as illustrated in FIG. 7B, a clearance C is formed between the concave engagement portion 102a of the rotator 102 and the engagement protrusion 103a of the main gear 103, which is engaged with the concave engagement portion 102a, in the circumferential direction. Such clearance C causes the main gear 103 to shift from or to the rotator 102, a detection error of the rotation angle of the steering wheel 1 occurs, and steering angle detection performance deteriorates.

In addition, since the main gear 103 is formed as a member separate from the rotator 102, a thickness in their radial direction has to become great in order to secure sufficient strength. Thus, it is not possible to reduce a reference pitch diameter Φα (refer to FIG. 5) of the main gear 31 and thereby, it is difficult to reduce the size in the radial direction of the steering angle sensor unit 101.

In contrast, in the steering angle sensor unit 12 according to the present embodiment, the main gear 31 with which the satellite gears 47 and 48 are meshed and the rotator 21 are integrally molded. Accordingly, it is possible for the main gear 31 not to shift from or to the rotator 21, compared to a case which the rotator 102 and the main gear 103 are separately molded. Thus, it is possible to prevent an occurrence of the detection error of the rotation angle of the steering wheel 1 and it is possible to improve the steering angle detection performance.

In addition, the main gear 31 is integrally molded with the rotator 21 and thereby, a thickness portion of the main gear 31 in its radial direction can be common with a thickness portion of the rotator 21 in its radial direction. Accordingly, the thickness portion is reduced in size with secured sufficient strength such that the reference pitch diameter Φα (refer to FIG. 5) of the main gear 31 can be reduced in size. Thus, the steering angle sensor unit 12 is reduced in size in the radial direction such that miniaturization and reduction of weight can be achieved. In addition, reduction of the number of the components and reduction of an amount of materials can be achieved, a mold cost can also be reduced, and thus, manufacturing costs can be reduced.

In addition, the main gear 31 is molded on the one end of the rotator 21 on the cancel cam 32 side to be adjacent to the cancel cam 32. Therefore, it is possible to suppress an influence of torsion of the rotator 21 when the steering wheel 1 rotates, compared to a case in which distance is formed between the cancel cam 32 and the main gear 31. Accordingly, it is possible to prevent an occurrence of a detection error of the rotation angle of the steering wheel 1 and further, it is possible to improve steering angle detection performance.

The present invention is not limited to the embodiments described above and can be appropriately modified, improved, or the like. Additionally, a material, a shape, a size, the number of, a disposed position, or the like of the respective components according to the embodiments described above are arbitrarily selected as long as the present invention can be achieved using the components and there is no limitation thereon.

According to the embodiments described above, the movable housing is configured of two parts of the following housing (rotator) 21 and the base housing 50, and the main gear 31 is provided on the following housing (rotator) 21. Alternatively, the main body section 21 may be provided on the base housing 50. In this case, the main gear may be formed over the outer circumferential surface of the outer cylinder 55 in the rotation direction. Further, the movable housing is configured of one part, the main gear 31 may be provided on the cylindrical section which is inserted into the fixed-side housing 40.

Aspects of the rotating connector according to the embodiments of the present invention, described above, are concisely summarized and listed in the following configurations [1] to [4].

[1] A rotating connector (ii) including:
a movable housing (a following housing 21 and a base housing 50) that includes a cylindrical section (inner cylinder 21a) through which a steering shaft penetrates and a main gear (31) integrally molded with the movable housing on an outer circumferential surface of the cylindrical section along a rotation direction; and
a steering angle sensor unit (12) that includes a fixed-side housing (40) into which the cylindrical section of the movable housing is inserted, a satellite gear (47, 48) which is provided in the fixed-side housing and meshed with the main gear, and a rotation angle detection unit (45) which is provided in the fixed-side housing and detects rotation of the satellite gear.

[2] The rotating connector according to the configuration [1], wherein the movable housing includes a first housing (following housing 21) having a first cylindrical section (21a) and a second housing (base housing 50) having a second cylindrical section (55), and the cylindrical section is formed by causing the first cylindrical section and the second cylindrical section to be integrally formed with each other.

[3] The rotating connector according to the configuration [2], wherein the main gear is formed on the first cylindrical section.

[4] The rotating connector according to the configuration [3], wherein the first housing includes a cancel cam (32) formed on the first cylindrical section, which causes a turn lever to be shifted to a neutral position, and
the main gear is formed on the first cylindrical section to be adjacent to the cancel cam.

What is claimed is:

1. A rotating connector comprising:
a base housing comprising an outer cylindrical section, which rotates along with a rotation of a steering wheel;
a following housing that comprises an inner cylindrical section attached within the outer cylindrical section of the base housing, through which a steering shaft penetrates, and a main gear integrally molded with the following housing on an outer circumferential surface of the inner cylindrical section along a rotation direction, wherein the following housing rotates along with a rotation of the base housing; and
a steering angle sensor unit that comprises a fixed-side housing into which the inner cylindrical section of the following housing is inserted, a satellite gear which is provided in the fixed-side housing and meshed with the main gear, and a rotation angle detection unit which is provided in the fixed-side housing and detects rotation of the satellite gear,
wherein the following housing includes a cancel cam formed on the inner cylindrical section, extending in a radial direction perpendicular to a direction in which the steering shaft penetrates the base housing.

2. The rotating connector according to claim 1, wherein the cancel cam causes a turn lever to be shifted to a neutral position, and
the main gear is formed on the inner cylindrical section to be adjacent to the cancel cam.

3. The rotating connector according to claim 1, wherein the inner cylindrical section comprises a guide groove, and the outer cylindrical section comprises an engagement portion, such that the engagement portion of the outer cylindrical section engages with the guide groove of the inner cylindrical section.

4. The rotating connector according to claim 1, wherein the satellite gear of the steering angle sensor unit comprises a first satellite gear and a second satellite gear, and wherein
the first satellite gear has a different pitch diameter than the second satellite gear.

5. The rotating connector according to claim 1, wherein the base housing further comprises a flange extending from an outer circumference of the outer cylindrical section.

6. The rotating connector according to claim 1, wherein the outer cylindrical section has an inner diameter larger than that of an outer diameter of the inner cylindrical section.

7. The rotating connector according to claim 1, wherein the steering angle sensor unit is at least partially retained between the base housing and the following housing.

8. A rotating connector comprising:
a base housing comprising an outer cylindrical section, which rotates along with a rotation of a steering wheel;
a following housing that comprises an inner cylindrical section attached within the outer cylindrical section of the base housing, through which a steering shaft penetrates, and a main gear integrally molded with the following housing on an outer circumferential surface of the inner cylindrical section along a rotation direction, wherein the following housing rotates along with a rotation of the base housing: and
a steering angle sensor unit that comprises a fixed-side housing into which the inner cylindrical section of the following housing is inserted, a satellite gear which is provided in the fixed-side housing and meshed with the main gear, and a rotation angle detection unit which is provided in the fixed-side housing and detects rotation of the satellite gear,
wherein the following housing includes a cancel cam formed on the inner cylindrical section, and
wherein the cancel cam is formed integrally with the following housing and the main gear.

9. The rotating connector according to claim 8, wherein the cancel cam causes a turn lever to be shifted to a neutral position, and
the main gear is formed on the inner cylindrical section to be adjacent to the cancel cam.

10. The rotating connector according to claim 8, wherein the inner cylindrical section comprises a guide groove, and the outer cylindrical section comprises an engagement portion, such that the engagement portion of the outer cylindrical section engages with the guide groove of the inner cylindrical section.

11. The rotating connector according to claim 8, wherein the satellite gear of the steering angle sensor unit comprises a first satellite gear and a second satellite gear, and wherein
the first satellite gear has a different pitch diameter than the second satellite gear.

12. The rotating connector according to claim 8, wherein the base housing further comprises a flange extending from an outer circumference of the outer cylindrical section.

13. The rotating connector according to claim 8, wherein the outer cylindrical section has an inner diameter larger than that of an outer diameter of the inner cylindrical section.

14. The rotating connector according to claim 8, wherein the steering angle sensor unit is at least partially retained between the base housing and the following housing.

* * * * *